United States Patent
Chung (10) Patent No.: US 12,434,840 B2
(45) Date of Patent: Oct. 7, 2025

(54) IN-CABIN PARTITION AND MOBILITY VEHICLE INCLUDING THE SAME

(71) Applicants: Hyundai Motor Company, Seoul (KR); Kia Corporation, Seoul (KR)

(72) Inventor: Jae Hoon Chung, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/197,349

(22) Filed: May 15, 2023

(65) Prior Publication Data

US 2024/0199210 A1  Jun. 20, 2024

(30) Foreign Application Priority Data

Dec. 16, 2022 (KR) .................. 10-2022-0177548

(51) Int. Cl.
 *B64D 11/00* (2006.01)
 *B64D 11/06* (2006.01)

(52) U.S. Cl.
 CPC ...... *B64D 11/0023* (2013.01); *B64D 11/0696* (2013.01)

(58) Field of Classification Search
 CPC ............ B64D 11/0026; B64D 11/0606; B64D 11/0696; B64C 1/10
 See application file for complete search history.

(56) References Cited

U.S. PATENT DOCUMENTS

| | | | | |
|---|---|---|---|---|
| 2,396,039 A | * | 3/1946 | Burton | B64D 11/0023 296/63 |
| 5,816,534 A | * | 10/1998 | Schumacher | B64D 11/0023 244/119 |
| 7,232,094 B2 | * | 6/2007 | Bishop | B64D 11/0696 244/118.6 |
| 7,429,190 B2 | * | 9/2008 | Hueber | B64D 11/0696 439/532 |
| 7,905,451 B2 | * | 3/2011 | Schotte | B64D 11/0696 244/118.6 |
| 8,668,181 B2 | * | 3/2014 | Dazet | B64D 11/0696 244/118.5 |
| 9,410,733 B1 | | 8/2016 | Kim | |
| 9,783,280 B2 | | 10/2017 | Llamas Sandin et al. | |
| 10,479,227 B2 | * | 11/2019 | Nolte | B60N 2/42736 |

(Continued)

FOREIGN PATENT DOCUMENTS

DE 10036551 A1 9/2001
JP 2010-0215095 A 9/2010

(Continued)

OTHER PUBLICATIONS

Feb. 1, 2024—(EP) Extended European Search Report—App 23197122.7.

*Primary Examiner* — Richard Green
(74) *Attorney, Agent, or Firm* — Banner & Witcoff, Ltd.

(57) ABSTRACT

An in-cabin partition may allow for automatically adjusting the size of a space, in a mobility vehicle, for passengers and cargo according to circumstances and/or needs. A mobility vehicle may be provided with the in-cabin partition. The in-cabin partition may include at least one rail installed in a cabin, a slider movable along the rail, a first driver mounted on the rail and the slider and configured to provide driving force for moving the slider, and a partition body fixed on the slider.

18 Claims, 6 Drawing Sheets

(56) References Cited

U.S. PATENT DOCUMENTS

| | | | |
|---|---|---|---|
| 11,007,905 B2* | 5/2021 | Sonar | B60N 2/0228 |
| 11,584,259 B2* | 2/2023 | Cantos | B64D 11/0696 |
| 11,919,643 B2* | 3/2024 | Vaninetti | B64D 11/0023 |
| 2010/0237193 A1 | 9/2010 | Yoshizaki | |
| 2012/0187248 A1 | 7/2012 | Goehlich et al. | |
| 2014/0117734 A1 | 5/2014 | Ruess et al. | |
| 2022/0010607 A1 | 1/2022 | McGreevy et al. | |

FOREIGN PATENT DOCUMENTS

| | | |
|---|---|---|
| KR | 10-2001-0096284 A | 11/2001 |
| KR | 10-2017-0016546 A | 2/2017 |
| KR | 10-2018-0076014 A | 7/2018 |

* cited by examiner

IN-CABIN PARTITION AND MOBILITY VEHICLE INCLUDING THE SAME

CROSS-REFERENCE TO RELATED APPLICATION(S)

This application claims benefit of priority to Korean Patent Application No. 10-2022-0177548 filed on Dec. 16, 2022, in the Korean Intellectual Property Office, the disclosure of which is incorporated herein by reference in its entirety.

TECHNICAL FIELD

The present disclosure relates to in-cabin partition, and a mobility vehicle including the same, that allows for automatically adjusting the size of a space in the mobility vehicle for passengers and/or cargo according to circumstances and/or needs.

BACKGROUND

Efficient passenger boarding and cargo loading are required to maximize the number of aircraft flights performed at a given time. The aircraft should be designed to optimally use an interior space with respect to the number of passengers and cargo capacity.

Conventional commercial aircraft may include an upper deck that is almost exclusively used for transporting passengers, and a lower deck that is exclusively used for transporting cargo.

However, even if aircraft are configured with a double deck, it is impossible to utilize extra or unoccupied room in a cabin or an upper deck so as to carry more cargo, for example, in a flight with few or no passengers.

SUMMARY

The following summary presents a simplified summary of certain features. The summary is not an extensive overview and is not intended to identify key or critical elements.

Systems, apparatuses, and methods are described for an in-cabin partition and operation thereof. The in-cabin partition may comprise at least one rail installed in a cabin, a slider movable along the rail, a first driver connected to the rail and the slider and configured to provide a driving force for moving the slider, and a partition body fixed on the slider.

Also, or alternatively, a mobility vehicle may comprise a cabin provided with a plurality of seats and an in-cabin partition according to the present disclosure.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, some aspects of the present disclosure will be described in detail with reference to the accompanying drawings. In designating elements of the drawings by reference numerals, the same elements will be designated by the same reference numerals although they are shown in different drawings.

For convenience of description, the present disclosure is described as an exemplary application to an air mobility vehicle with a cabin, but the present disclosure is not necessarily limited thereto. For example, the present disclosure may be applied to any mobility vehicle (e.g., an air mobility vehicle, a water or underwater mobility vehicle, a land mobility vehicle, an all- or multi-terrain mobility vehicle, etc.) with a cabin or an interior.

In addition, it will be understood that, although the terms first, second, etc., may be used herein to describe various elements, these elements should not be limited in order, size, location, or importance by these terms, and these terms are only used to distinguish one element from another.

Figure 1:
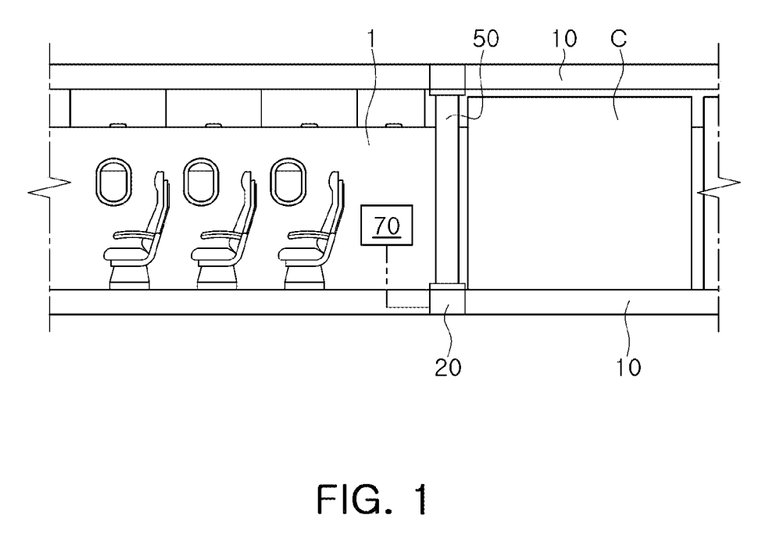
FIG. 1 is a side view of an in-cabin partition according to an example of the present disclosure.
Figure 2:
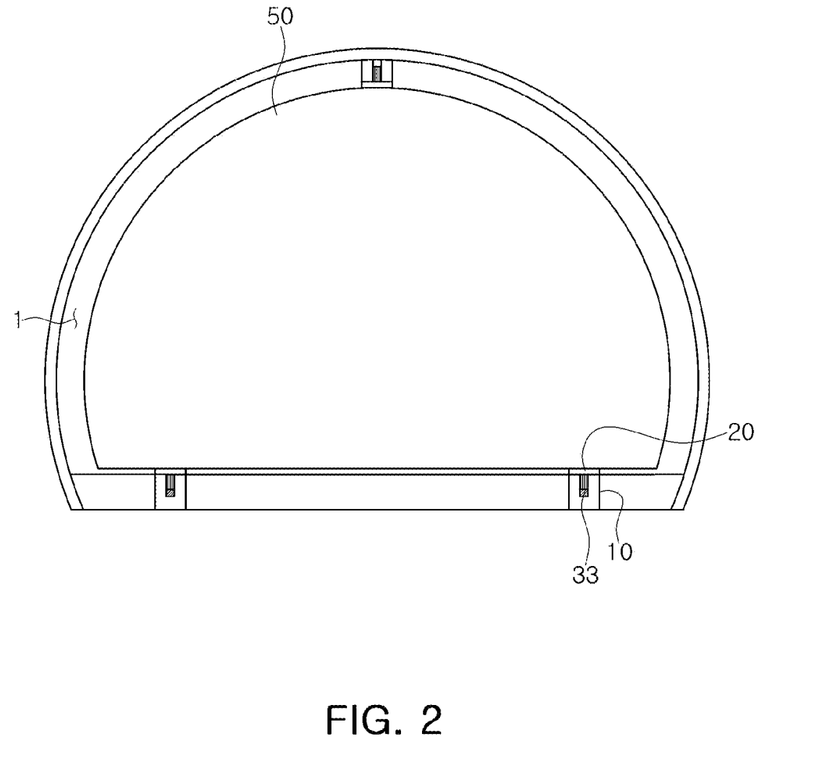
FIG. 2 is a front view of the in-cabin partition according to an example of the present disclosure.
Figure 3A:
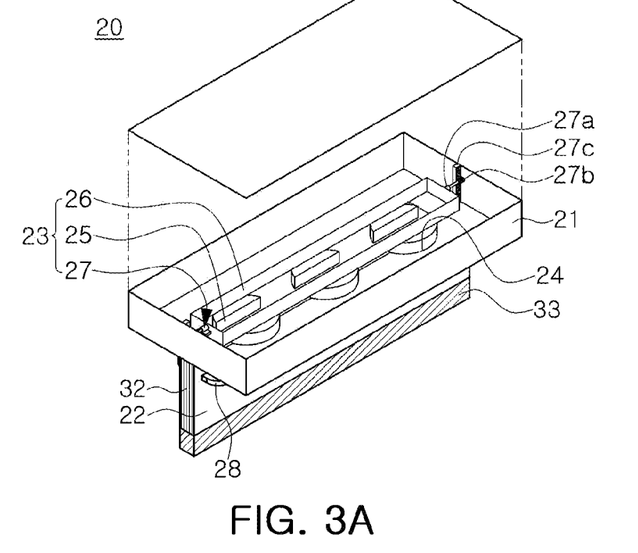
FIGS. 3A and 3B are perspective views illustrating a first driver.
Figure 3B:
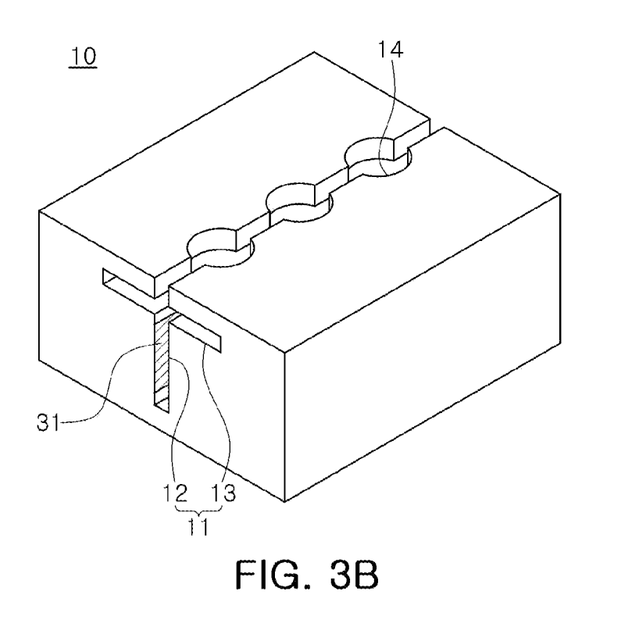
Figure 4:
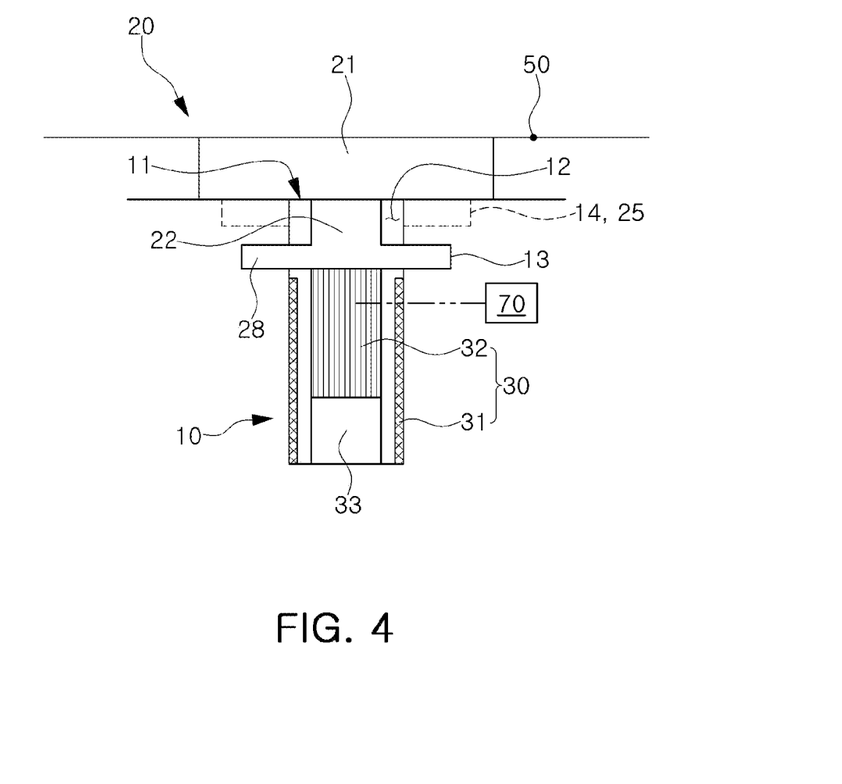
FIG. 4 is a cross-sectional view illustrating the first driver.

FIG. 1 is a side view of an in-cabin partition according to an example of the present disclosure, FIG. 2 is a front view of the in-cabin partition according to an example of the present disclosure, and FIGS. 3A and 3B are perspective views illustrating a first driver, where FIG. 3A is a perspective view of a slider, and FIG. 3B is a perspective view of a rail. FIG. 4 is a cross-sectional view illustrating the first driver.

The in-cabin partition according to an example of the present disclosure may include at least one rail 10, a slider 20, a first driver 30, and a partition body 50.

At least one rail 10 may be disposed on a floor and/or a ceiling of a cabin 1 in a longitudinal direction of the cabin (e.g., in a front/rear direction of the cabin). The rail 10 may be formed at least partially of a conductive material, such as a metal. The rail 10 may form a groove 11 therein that extends in the longitudinal direction of the rail 10.

The groove 11 may have a substantially cross-shaped cross-section (e.g., transverse to the longitudinal direction). The groove 11 may include a main groove 12 and a separation prevention groove 13 formed in a direction crossing the main groove and extending in a longitudinal direction of the rail 10. The main groove 12 may be exposed to the outside through an opening of the groove 11 through a surface of the rail 10.

In addition, a plurality of locking grooves 14 spaced apart from each other at intervals in the longitudinal direction of the rail 10 may be formed in at least one edge of the groove 11.

Although an example in which the at least one rail 10 is disposed on the floor and/or the ceiling of the cabin 1 is illustrated and described, the present disclosure is not limited thereto, and for example, the rail 10 may be installed on a sidewall of the cabin 1.

In the in-cabin partition according to an example of the present disclosure, the rail 10 may serve to guide a movement of the partition body 50 and form a portion of the first driver 30 to provide moving force to the partition body 50. Furthermore, the rail 10 may be electrically connected to the power source and configured to allow a current to flow through the rail 10 so that a current may be applied to a coil of the first driver through the slider 20.

The slider 20 may be inserted into the rail 10. That is, the slider may be inserted into the main groove 12 of the groove 11, and may slide forwards and backwards in the longitudinal direction of the rail 10 in the groove 11 of the rail 10.

To this end, the slider 20 may have a cross-sectional shape corresponding to a cross-sectional shape of the groove 11 of the rail 10 (e.g., the transverse cross-sectional shape of the groove 11). For example, the slider 20 may be formed to be substantially T-shaped. Accordingly, the slider 20 may include a support 21 (e.g., a flat support 21) supporting the partition body 50 and an insertion portion 22 orthogonally connected to the support 21 and configured to be inserted into the main groove 12 of the groove 11.

At least the support 21 may be formed to have a hollow portion, and may include a position fixing unit 23 installed to extend outside of or retract inside of the hollow portion. To this end, at least one through-hole 24 may be formed in one side surface of the support 21.

The position fixing unit 23 may include at least one stud 25, a frame 26 connected to the stud 25, and a second driver 27 installed in the hollow portion of the support 21 to provide driving force for moving the frame 26.

The stud 25 may be, for example, a pillar with a substantially semicircular cross-section, and may be inserted into the corresponding locking groove 14 while being shape-fitted to one of the plurality of locking grooves 14 of the rail 10. However, the shape of the stud 25 is not necessarily limited thereto and may have any other polygonal and/or elliptical and/or irregular cross-sectional shape.

The frame 26 may connect the stud 25 and the second driver 27 and may serve as a stopper for preventing the stud 25 from being completely separated from the support 21 through the through-hole 24. In addition, when a plurality of studs 25 are provided, the frame 26 may connect the plurality of studs 25 so that these studs 25 can move integrally.

A rack and a pinion mechanism may be adopted as the second driver 27. For example, the second driver 27 may include a motor 27a installed in the frame 26, a pinion gear 27b connected to a motor shaft of the motor 27a, and a rack gear 27c installed in the hollow portion of the support 21 to engage with the pinion gear 27b.

When the pinion gear 27b connected to the motor shaft of the motor 27a rotates by the driving force of the motor 27a, the pinion gear 27b moves along the rack gear 27c while rotating by engaging with the rack gear 27c. Accordingly, the stud 25 may protrude from the support 21 through the through-hole 24 while the frame 26 and at least one stud 25 move along with the movement of the pinion gear 27b.

The protruding stud 25 may be inserted into the corresponding locking groove 14 while being shape-fitted to one of the plurality of locking grooves 14 of the rail 10. Accordingly, the position of the slider 20 with respect to the rail 10 may be determined to be fixed.

The motor 27a may rotate forwards and/or backwards according to an application of power. The stud 25 may reciprocate with driving force according to the operation of the motor 27a, and the stud 25 may protrude from a surface of the support 21 or may be immersed (e.g., retract) into the hollow portion of the support 21 based on the driving force.

The second driver 27 may be provided in pairs to implement a stable operation of the stud 25. The configuration of the second driver 27 is not limited to the above-described example, and, for example, a fluid pressure cylinder such as a pneumatic cylinder, and an electric actuator such as a solenoid actuator, which have an operating rod, may be adopted as the second driver 27.

In addition, the insertion portion 22 may include a separation prevention portion 28 formed to protrude in a direction crossing a movement direction of the slider 20 and configured to be insertable into the separation prevention groove 13 of the groove 11.

The separation prevention portion 28 and the separation prevention groove 13 may constitute a means for preventing the slider 20 from being separated from the rail 10 in a height direction of the cabin 1 when the in-cabin partition according to an example of the present disclosure is connected to the floor and the ceiling of the cabin 1 of the mobility vehicle.

Accordingly, the in-cabin partition may be continuously and stably supported by the floor and/or the ceiling of the cabin 1 for any movement of the mobility vehicle.

In the in-cabin partition according to an example of the present disclosure, the rail 10 and the slider 20 may form a portion of the first driver 30. For example, the first driver 30 of the in-cabin partition according to an example of the present disclosure may adopt a linear motor.

To this end, a plurality of permanent magnets 31 may be arranged on an internal wall of the rail 10 in the longitudinal direction of the rail 10, and coils 32 may be wound and/or stacked on the insertion portion 22 of the slider 20.

The plurality of permanent magnets 31 may be disposed on each internal wall of the rail 10 such that different polarities may be alternately arranged, but may be aligned with permanent magnets on the opposite inner wall such that the magnet portions having the same polarity may face each other. Each of the permanent magnets 31 may be fixed to the rail using any suitable technology such as, for example, an adhesive, a fastener, or the like.

The coils 32 may be wound and/or stacked on the insertion portion 22 of the slider 20 so as to form a magnetic void that faces the surfaces of the permanent magnets 31. An appropriate current for the position of the permanent magnet 31 is applied to the coil 32 at every phase to generate a magnetic flux around the coil 32, and such a magnetic flux may interact with a magnetic flux of the permanent magnet 31, thus generating electromagnetic force (e.g., a moving force). Accordingly, the slider 20 may be linearly movable in the rail 10.

The coils 32 and the permanent magnets 31 are not in physical contact with each other. A change in the magnetic flux may occur when a current flows through the coil 32, and accordingly, the moving force may be generated between the coils 32 and the permanent magnets 31.

For example, a current may have a positive (+) value, zero (0), and/or a negative (−) value at different times (e.g., at regular intervals). The direction and/or magnitude of the current in the coil 32 may be applied to generate positive moving force in some or all coils, given a direction of the magnetic flux generated by the permanent magnet 31. Accordingly, a linear movement may be performed in a single direction. When a reverse movement is required, a current for generating negative moving force may be provided to some or all coils 32.

In the in-cabin partition according to an example of the present disclosure, the permanent magnet 31 may be installed on the rail 10 to fix a position thereof, and the coils 32 may be disposed on the slider 20 to move the coils, but the present disclosure is not limited thereto. The coils 32 may be installed on the slider 20 and the permanent magnets may be disposed on the rail so that the permanent magnets 31 move with the slider.

The in-cabin partition according to an example of the present disclosure may selectively further include a connection terminal 33, mounted on the slider 20 so as to be disposed between the rail 10 and the slider 20, which may be configured to slide while in contact with the rail 10, and which may be electrically connected to the rail, through which the current flows.

The connection terminal 33 may be formed of a conductor. The connection terminal may be made of a material having excellent electrical conductivity, and may be fixedly installed in an end of the insertion portion 22 of the slider 20 using any suitable technology, such as an adhesive and/or a fastener. The connection terminal 33 may be electrically connected to the coil 32.

Accordingly, within the rail 10, which may be electrically connected to a power source (not illustrated) and through which the current may flow from the power source, the connection terminal 33 may slide with the slider 20 to continuously contact an internal surface of the rail. Through such contact, the connection terminal 33 may transmit the current applied from the rail 10 to the coil 32 and supply the power source to the first driver 30.

In the in-cabin partition according to an example of the present disclosure, the partition body 50 may be fixedly installed on the slider 20. For example, in order to implement stable support and movement of the partition body 50, a plurality of sliders 20 may be connected to a lower end of the partition body 50, and at least one slider 20 may be connected to an upper end of the partition body 50.

The partition body 50 may comprise, for example, a substantially plate-shaped member having a predetermined thickness. However, the shape of the partition body 50 is not necessarily limited thereto and may be formed to have any other shape.

For example, the partition body 50 may comprise a plurality of horizontal frames and/or a plurality of vertical frames and may form a plurality of storage spaces. A passenger's baggage may be accommodated in the storage spaces.

In addition, a lighting fixture, a refrigerator, or a heating device may be installed in the partition body 50. The power of such electric appliances may be obtained through the connection terminal 33 in contact with the rail 10 through which current flows.

The partition body 50 may be fixedly coupled to the slider 40 using any suitable technique, such as welding or a fastener. Accordingly, the partition body 50 may move linearly according to the movement of the slider 20.

As illustrated in FIGS. 1 and 2, the in-cabin partition according to an example of the present disclosure is disposed across the cabin 1 inside the cabin 1 in a transverse direction (e.g., width direction) of the cabin 1 (e.g., so as to at least block a corridor in the cabin 1).

The in-cabin partition according to an example of the present disclosure may further include a controller 70 configured to control one or more operations of the first driver 30 and/or the second driver 27 so as to selectively cause movement of the in-cabin partition.

The controller 70 may be communicatively connected to the first driver 30 and/or the second driver 27 through, for example, at least one of wired communication, wireless communication, and/or a combination of wired and wireless communications. For example, the controller 70 may be configured to transmit a control signal to each of the drivers 30 or 27 through a controller area network (CAN).

The controller 70 may be a computing device comprising a memory, a processor, a microprocessor, or the like. The memory may store an algorithm and/or instructions for controlling components of the first driver 30 or the second driver 27. Specifically, the memory may store an algorithm and/or instructions for controlling an operation of the corresponding motor. The controller 70 may also, or alternatively, store data for a program reproducing the algorithm. The processor or microprocessor may execute the stored algorithm or instructions to cause performance of predetermined control of the components of each driver (e.g., the corresponding motor) using data stored in the memory.

In addition, the controller 70 may be merged into or used in, for example, a control system of the mobility vehicle. The controller 70 may control an overall operation of the in-cabin partition according to an example of the present disclosure.

Figure 5A:
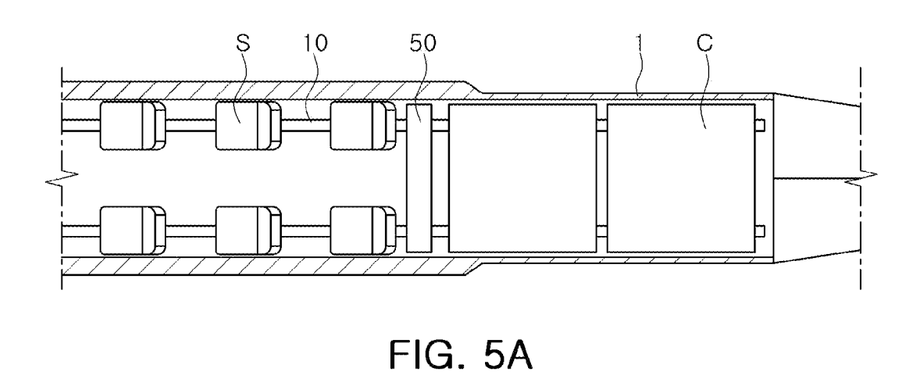
FIGS. 5A and 5B are plan views illustrating a mobility vehicle to which the in-cabin partition is applied according to an example of the present disclosure.
Figure 5B:
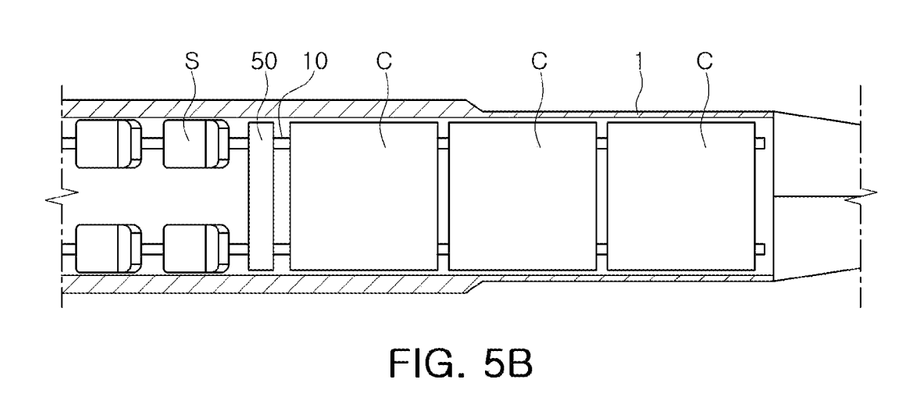
Figure 6:
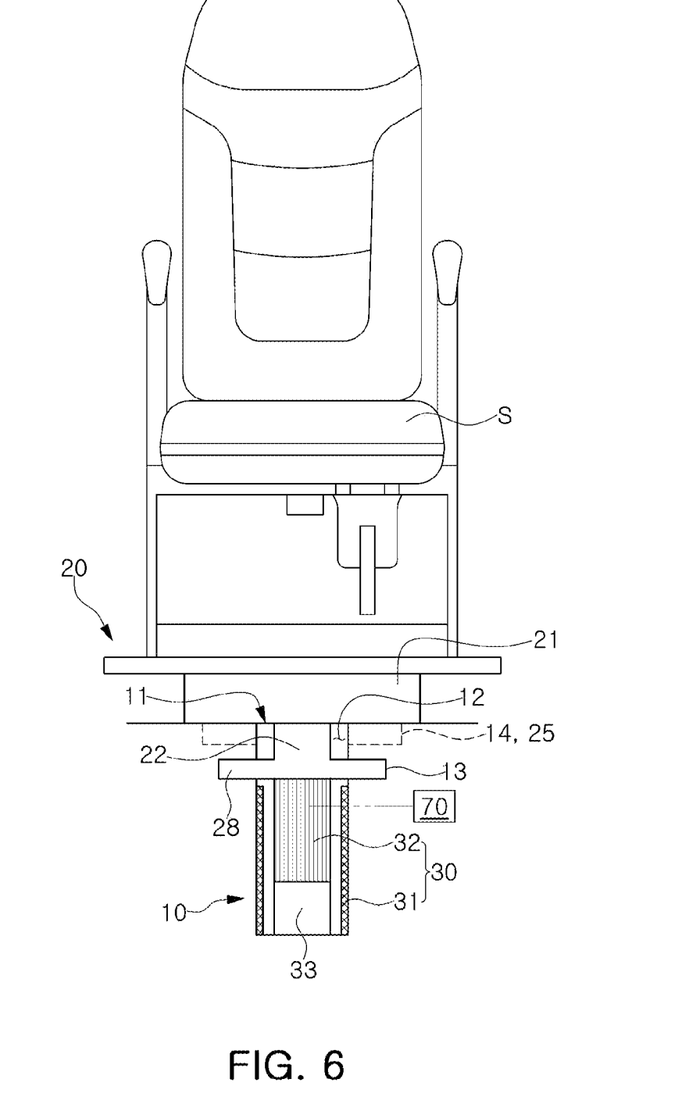
FIG. 6 is a view illustrating a seat applied with the in-cabin partition according to an example of the present disclosure.

FIGS. 5A and 5B are plan views illustrating the mobility vehicle to which the in-cabin partition is applied according to an example of the present disclosure, and FIG. 6 is a view illustrating a seat applied with the in-cabin partition according to an example of the present disclosure.

For example, before the operation of the mobility vehicle, a layout of the cabin 1 may be changed and an internal space of the cabin 1 may be redistributed and reconstructed depending on the number of passengers or the capacity of a cargo C input to the controller 70 in advance. Some of passenger seats S may be removed or a volume of the seat S may be reduced by folding a cushion thereof upward. Conversely, some of the passenger seats S may be added or a gap between seat rows may be adjusted so as to accommodate more passengers.

Also, or alternatively, (see, e.g., FIG. 6) the rail 10, the slider 20, and the first driver 30 of the present disclosure may be applied to one or more seats S. In other words, the one or more seats S may be installed on the support 21 of the slider 20, and the rail 10 and the slider 20 may form a portion of the first driver having the linear motor.

Also, or alternatively, the one or more seats S may comprise the connection terminal 33, mounted on the slider 20 so as to be disposed between the rail 10 and the slider 20, which may slide while in contact with the rail 10, and which is electrically connected to the rail 10 through which current may flow.

The seat S may be provided with motors for adjusting angles of a backrest and/or a cushion or rotation of the seat S, a monitor, a lighting lamp, a ventilation device, a heating device, and/or the like. The power of such electric appliances may be obtained through the connection terminal 33 in contact with the rail 10 through which current may flow.

In such a configuration, the one or more seats S (e.g., each seat S individually, and/or each row of the seats S) may be controlled to move along the rail 10, thereby providing easily adjustment of the space for the passengers in the cabin 1.

In addition, the one or more seats (e.g., each of the seats S and/or each seat row of seats S) may be easily connected to the power source for convenience.

After the space for the passengers is adjusted as described above, the controller 70 may control the first driver 30 of the in-cabin partition to linearly move the in-cabin partition along the rail 10 so that the in-cabin partition may be placed in an appropriate position within the cabin 1 (e.g., a desired position based on a number of passengers and/or cargo C). After the position of the in-cabin partition is determined, the controller 70 may control the second driver 27 to operate the stud 25, thereby fixing the position of the in-cabin partition.

After passenger boarding is completed, the cargo C may be loaded in the remaining space in the cabin 1.

As described above, according to an example of the present disclosure, it is possible to significantly reduce the time and process required for changing the layout in the cabin 1 of the mobility vehicle.

In addition, according to an example of the present disclosure, a single mobility vehicle may be utilized for various purposes, thereby reducing costs and maximizing profits.

The present disclosure provides an in-cabin partition and a mobility vehicle including the same for automatically adjusting a size of a space for passengers and cargo according to circumstances and needs.

The in-cabin partition may include at least one rail installed in a cabin, a slider movable along the rail, a first driver mounted on the rail and the slider and configured to provide driving force for moving the slider, and a partition body fixed on the slider.

The rail may include a groove formed to extend in a longitudinal direction thereof, the groove may include a main groove and a separation prevention groove formed in a direction crossing the main groove and extending in the longitudinal direction of the rail, the slider may include a flat support configured to support the partition body and an insertion portion connected to the support orthogonally and inserted into the main groove, and the insertion portion may include a separation prevention portion formed to protrude from the insertion portion and configured to be insertable into the separation prevention groove.

A plurality of locking grooves spaced apart from each other at intervals in the longitudinal direction of the rail may be formed in at least one edge of the groove, and the support may include a hollow portion, a position fixing unit installed to appear outside or disappear inside the hollow portion, and at least one through-hole formed in one side surface thereof.

The position fixing unit may include at least one stud, a frame connected to the stud, and a second driver installed in the hollow portion and configured to provide driving force for moving the frame, and the stud may be inserted into one of the plurality of locking grooves through the through-hole.

The second driver includes a motor installed in the frame, a pinion gear connected to a motor shaft of the motor, and a rack gear installed in the hollow portion of the support and configured to engage with the pinion gear.

The first driver may be a linear motor, and one of the rail and the slider may include a plurality of permanent magnets arranged in the longitudinal direction, and the other thereof may be provided with coils, the coils being wound or stacked.

The in-cabin partition may further include a connection terminal mounted on the slider, configured to slide while coming into the contact with the rail, and electrically connected to the rail through which a current flows, and the connection terminal may be electrically connected to the first driver.

A mobility vehicle may include a cabin provided with a plurality of passenger seats, and the in-cabin partition.

One or more of the seats may be mounted on a slider movable along the rail, and one of the rail or the slider may include a plurality of permanent magnets arranged in a longitudinal direction, and the other thereof may be provided with coils, the coils being wound or stacked.

The mobility vehicle may further include a connection terminal mounted on the slider, configured to slide while coming into the contact with the rail, and electrically connected to the rail through which a current flows, and the connection terminal may be electrically connected to the coil.

Although examples of the present disclosure have been described for illustrative purposes, those skilled in the art will appreciate that various changes and modifications are possible, without departing from essential characteristics of the disclosure.

Accordingly, the examples disclosed in the present disclosure are intended to illustrate the scope of the technical idea of the present disclosure, and the scope of the present disclosure is not limited by the example. The scope of the present disclosure shall be construed on the basis of the accompanying claims in such a manner that all of the technical ideas included within the scope equivalent to the claims belong to the present disclosure.

What is claimed is:

1. An in-cabin partition comprising:
   at least one rail installed in a cabin;
   a slider movable along the rail;
   a first driver connected to the rail and the slider and configured to provide a driving force for moving the slider; and
   a partition body fixed on the slider,
   wherein the slider comprises a support configured to support the partition body,
   wherein the support comprises a hollow portion and a position fixing unit configured to protrude outside of or retract inside of the hollow portion via at least one through-hole formed in a side surface of the support,
   wherein the position fixing unit comprises:
      at least one stud,
      a frame connected to the stud, and
      a second driver installed in the hollow portion and configured to provide driving force for moving the frame, and
   wherein the second driver comprises:
      a motor connected to the frame,
      a pinion gear connected to a motor shaft of the motor, and
      a rack gear in the hollow portion of the support and configured to engage with the pinion gear.

2. The in-cabin partition according to claim 1,
   wherein the rail forms a groove that extends in a longitudinal direction thereof, the groove comprising:
   a main groove that extends in a first transverse direction of the rail and in a longitudinal direction of the rail, and
   a separation prevention groove that extends in a second transverse direction of the rail, so as to cross the main groove, and in the longitudinal direction of the rail;
   wherein the slider further comprises an insertion portion connected to the support orthogonally and configured to be inserted into the main groove; and
   wherein the insertion portion comprises a separation prevention portion formed to protrude from the insertion portion and configured to be inserted into the separation prevention groove.

3. The in-cabin partition according to claim 2,
   wherein a plurality of locking grooves spaced apart from each other at intervals in the longitudinal direction of the rail are formed in at least one edge of the groove.

4. The in-cabin partition according to claim 3,
   wherein the at least one stud is configured to be inserted into at least one of the plurality of locking grooves via the at least one through-hole.

5. The in-cabin partition according to claim 1,
wherein the first driver comprises a linear motor, and
wherein one of the rail or the slider comprises a plurality of permanent magnets arranged in a longitudinal direction of the rail, and the other of the rail or the slider comprises coils that are wound or stacked.

6. The in-cabin partition according to claim 1, further comprising:
a connection terminal coupled to the slider so as to contact the rail when the slider is inserted in a groove of the rail, wherein the connection terminal is configured to be electrically connected to the rail, and electrically connected to the first driver.

7. The in-cabin partition according to claim 1, further comprising:
a connection terminal coupled to the slider so as to contact the rail,
wherein the rail is formed at least partially of a conductive material, and electrically connected to a power source,
wherein the first driver comprises a linear motor,
wherein the rail comprises a plurality of permanent magnets arranged in a longitudinal direction of the rail, and the slider comprises coils that are wound or stacked,
wherein the plurality of permanent magnets and the coils form the linear motor, and
wherein the connection terminal is configured to be electrically connected to the rail and the coils, to transmit current applied from the rail to the coils, and to slide with the slider.

8. The in-cabin partition according to claim 1,
wherein the rail comprises a first groove and a second groove,
wherein the second groove crosses the first groove,
wherein the first groove comprises a first portion of the first driver,
wherein the slider comprises a first protrusion and a second protrusion,
wherein the first protrusion is configured to be movable along the first groove,
wherein the second protrusion is configured to be movable along the second groove, and
wherein the first protrusion comprises a second portion of the first driver.

9. The in-cabin partition according to claim 8,
wherein the first groove is a vertical groove,
wherein the second groove is a horizontal groove that intersects the vertical groove,
wherein the first portion of the first driver comprises a plurality of magnets, and
wherein the second portion of the first driver comprises coils.

10. The in-cabin partition according to claim 8,
wherein the first protrusion of the slider comprises a connection terminal, and
wherein the connection terminal is configured to be electrically connected to the second portion of the first driver and to a surface of the first groove.

11. The in-cabin partition according to claim 8,
wherein the at least one rail further comprises a plurality of locking grooves formed on an upper portion of the first groove, and
wherein the slider comprises a plurality of studs,
wherein each of the plurality of studs is configured to be inserted into a respective locking groove of the plurality of locking grooves.

12. The in-cabin partition according to claim 8,
wherein the slider comprises a plurality of studs, and
wherein the plurality of studs are protruded from a surface of the support of the slider or retracted into a hollow portion of the support of the slider.

13. A slider apparatus comprising:
at least one rail comprising a first groove and a second groove, wherein the second groove crosses the first groove, and wherein the first groove comprises a first portion of a first driver;
a slider comprising a first protrusion and a second protrusion, wherein the first protrusion is configured to be movable along the first groove, wherein the second protrusion is configured to be movable along the second groove, wherein the first protrusion comprises a second portion of the first driver, and wherein the first driver is configured to provide a driving force for moving the slider; and
a body fixed on the slider,
wherein the slider further comprises:
a plurality of studs, and
a second driver configured to provide driving force for moving a frame, wherein the frame is connected to the plurality of studs,
wherein the plurality of studs are protruded from a surface of a support of the slider or retracted into a hollow portion of the support of the slider,
wherein the second driver comprises:
a motor connected to the frame,
a pinion gear connected to a motor shaft of the motor, and
a rack gear in the hollow portion of the support and configured to engage with the pinion gear.

14. The slider apparatus according to claim 13,
wherein the first groove is a vertical groove,
wherein the second groove is a horizontal groove that intersects the vertical groove,
wherein the first portion of the first driver comprises a plurality of magnets, and
wherein the second portion of the first driver comprises coils.

15. The slider apparatus according to claim 13,
wherein the first protrusion of the slider comprises a connection terminal, and
wherein the connection terminal is configured to be electrically connected to the second portion of the first driver and to a surface of the first groove.

16. The slider apparatus according to claim 13,
wherein the at least one rail further comprises a plurality of locking grooves formed on an upper portion of the first groove, and
wherein each of the plurality of studs is configured to be inserted into a respective locking groove of the plurality of locking grooves.

17. An apparatus comprising:
at least one rail installed in a cabin;
a slider movable along the rail;
a first driver connected to the rail and the slider and configured to provide a driving force for moving the slider; and
a partition body fixed on the slider,
wherein the slider comprises:
an insertion portion disposed on the first driver and comprising a separation prevention portion protruding in a direction perpendicular to a movement direction of the slider; and a support disposed on the insertion portion and configured to support the partition body, and wherein the support comprises:

a hollow; and a protruding stud configured to be retracted inside of the hollow and to protrude outside of the hollow via at least one through-hole formed in a side surface of the support, wherein the apparatus further comprises a second driver installed in the hollow via the at least one through-hole, and wherein the second driver comprises:

a motor connected to a frame, a pinion gear connected to a motor shaft of the motor, and a rack gear in the hollow of the support and configured to engage with the pinion gear.

18. The apparatus according to claim 17, wherein the rail forms a groove that extends in a longitudinal direction thereof, the groove comprising:

a main groove that extends in a first transverse direction of the rail and in a longitudinal direction of the rail, and a separation prevention groove that extends in a second transverse direction of the rail, so as to cross the main groove, and in the longitudinal direction of the rail;

wherein the insertion portion is connected to the support orthogonally and configured to be inserted into the main groove; and wherein the separation prevention portion is configured to protrude from the insertion portion and configured to be inserted into the separation prevention groove.

\* \* \* \* \*